Feb. 13, 1962   R. A. LE BEAU   3,020,984
RAILWAY BRAKE BEAM LEVELING DEVICE
Filed Nov. 24, 1958   2 Sheets-Sheet 1
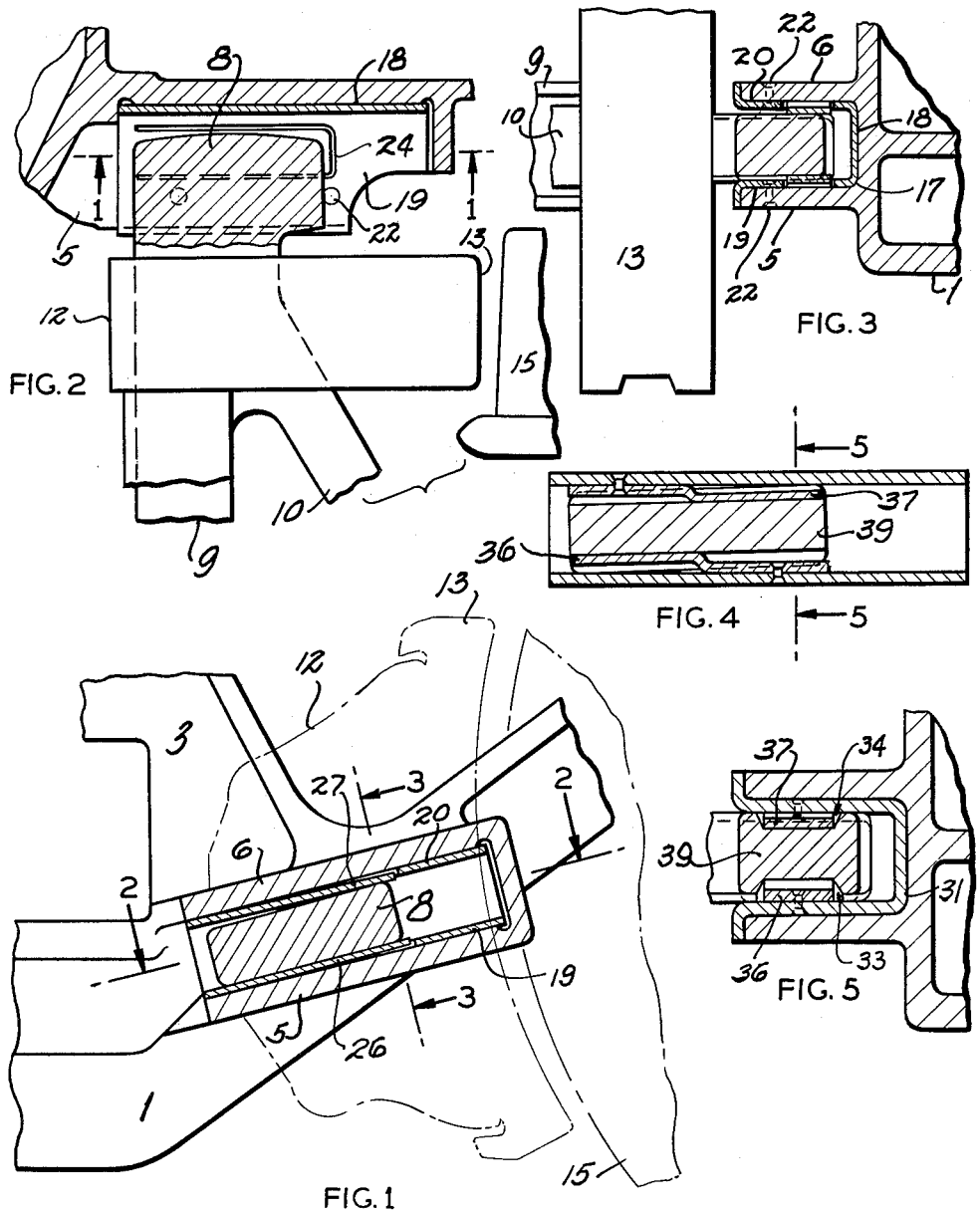
INVENTOR.
Richard A. Le Beau
BY Rodney Bedell
atty Feb. 13, 1962 R. A. LE BEAU 3,020,984
RAILWAY BRAKE BEAM LEVELING DEVICE
Filed Nov. 24, 1958 2 Sheets-Sheet 2

INVENTOR.
Richard A. Le Beau
BY Rodney Bedell
atty.

United States Patent Office 3,020,984
Patented Feb. 13, 1962

3,020,984
RAILWAY BRAKE BEAM LEVELING DEVICE
Richard A. Le Beau, Palos Heights, Ill., assignor, by mesne assignments, to American Seal-Kap Corporation of Delaware, New York, N.Y., a corporation of Delaware
Filed Nov. 24, 1958, Ser. No. 775,744
3 Claims. (Cl. 188—212)

The invention relates to railway rolling stock brake gear and more particularly to the mounting of a brake beam upon the side frames of a truck wherein the beam is of the type having a lug or paddle or tang projecting lengthwise of the beam beyond the brake head and slidably supported from brackets provided therefor on the side frames.

The main object of the invention is to provide accurate and yielding guiding support for the beam in its movement to and from the wheels irrespective of the length of time the beam has been in service, thereby maintaining the beam in proper angular relation to the wheels and avoiding undesirable uneven wear on the brake shoes. The invention also provides that the brake shoes will seat against the wheels irrespective of variations in the height of the beam such as may be due to the truck side frames dropping because of wear on component truck parts, which otherwise would affect the brake efficiency.

In the accompanying drawings illustrating the invention:

FIGURE 1 is a side elevation of a portion of a truck side frame having a bracket for receiving a brake beam tang, the bracket and tang being shown in cross section. Also indicated is the adjacent portion of the wheel and brake head. The view in section is taken approximately on line 1—1 of FIGURE 2.

FIGURE 2 is a horizontal section and top view of the structure shown in FIGURE 1 and is taken approximately on line 2—2 of FIGURE 1.

FIGURE 3 is a detail vertical section on line 3—3 of FIGURE 1.

FIGURE 4 is a vertical section through a bracket and beam tang corresponding to that shown in section in FIGURE 1 but illustrating another form of the invention.

FIGURE 5 is a vertical section on line 5—5 of FIGURE 4.

Figure 6:
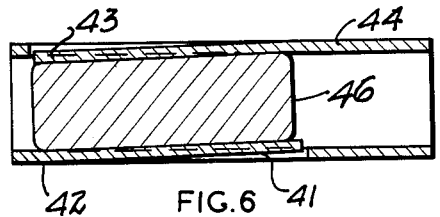
FIGURE 6 is a section corresponding generally to FIGURE 4 but illustrating another form of the invention.

In FIGURES 1, 2 and 3 the lower portion of the truck side frame is indicated at 1. A portion of one of the side frame columns is shown at 3. Webs 5 and 6 project inboard of the truck side frame and form a bracket receiving between the webs the tang 8 on the end of the brake beam which is of truss type having a compression member 9 and a tension member 10. Brake heads 12 are mounted on the ends of the beam in a suitable manner and are provided with replaceable shoes 13 for application to the truck wheels 15 when the brakes are applied.

When the beam is supported on the tangs, there is a tendency for it to tilt vertically about a longitudinal axis passing through the beam center of gravity which is positioned forwardly of the tangs so that its front or rear lower edge rides on bracket web 5 and a diagonally opposite upper edge slides along the lower face of the upper bracket web 6 and is subject to continued vibration by the travel of the truck over the rails. This tends to wear down the corners of the tang, providing increasing play between the tang and the bracket web. With such wear, the brake shoe does not remain radial with the tread of the wheel and, therefore, during a brake application, the upper portion of the brake shoe contacts the wheel before the lower portion, developing an undesirable slap during the brake application. This result follows irrespective of the presence or absence of wear plates on the bracket webs as are usually provided.

To avoid this result, the present invention embodies a novel form of wear plate 17 between the tang and the bracket webs. This novel wear plate is of U-section with a vertical cross bar 18 (FIGURE 3), a lower leg 19 and an upper leg 20. The U-section fits snugly between the bracket webs and may be riveted thereto as indicated at 22. The wear plate is slit or stamped so that a tongue 26, 27 extends inwardly from near one end of each wear plate leg for about half the length of the wear plate, as indicated at 24 (FIGURE 2). Each tongue 26, 27 is offset from the remainder of its wear plate leg toward the opposite leg. The lower tongue 26 forms a yielding support for the brake beam tang 8 and the upper tongue 27 forms a yielding guide for the upper forward edge of the tang irrespective of the movement of the beam toward and from the wheels.

As shown in FIGURE 1, wear plate tongue 26 engages the lower face of the tang throughout the width of the tang and levels the tang during brake beam release so that the brake shoe remains concentric with the wheel trend. The upper tongue may contribute to the leveling action as it holds the tang against play between the bracket webs. Also the provision of the offset upper tongue opposite to the lower tang enables the wear plate to be made reversible and to avoid rights and lefts.

FIGURES 4 and 5 illustrate another form of the invention in which the U-section wear plate 31 corresponds generally to that shown in FIGURES 1-3, but the slits 33 and 34 on the lower and upper legs respectively of the wear plate extend inwardly from opposite ends of the latter so that the corresponding tongues 36 and 37 are offset toward and engage diagonally opposite lower and upper marginal portions of the brake beam tang 39. Each tongue forms an extended surface for engagement with the opposing face of the tang but neither face of the tang is engaged throughout its width as shown in FIGURE 1. With this arrangement, as with that shown in FIGURES 1, 2, 3, the wear plate is reversible and rights and lefts are not required.

FIGURE 6 illustrates an arrangement in which the tongue 41 in the wear plate lower leg 42 corresponds to that shown in FIGURE 1, but the tongue 43 in the wear plate upper leg 44 is offset near the left hand end of the wear plate so as to provide a full width engagement with the top face of the brake beam tang 46. The wear plate will be riveted to the side frame bracket web (not shown) as previously described.

Figure 7:
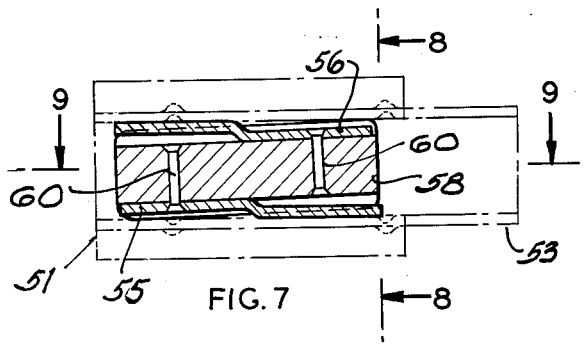
FIGURE 7 is a similar section illustrating another form of the invention and taken on line 7—7 of FIGURE 8.
Figure 8:
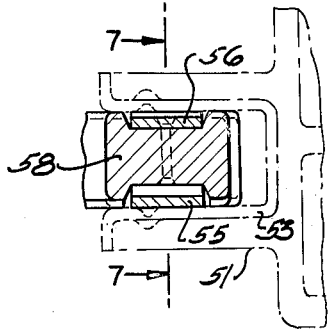
FIGURE 8 is a vertical section on line 8—8 of FIGURE 7.
Figure 9:
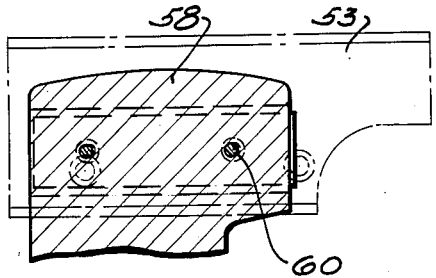
FIGURE 9 is a horizontal section on line 9—9 of FIGURE 7.

FIGURES 7, 8 and 9 illustrate another form of the invention in which the truck side frame bracket 51 is provided with a liner 53 which is U shape in vertical section but the legs of the U are not slit and do not form offset tongues. Individual wear plates 55 and 56 are seated in grooves provided therefor in the upper and lower faces of the brake beam tang 58 and are riveted to the tang as indicated at 60. Each wear plate 55 is offset away from the tang to yieldingly engage the opposing face of liner 53. With this arrangement both the truck frame and the tang are provided with individual renewable wear surfaces which would serve to more effectively maintain the desired clearance and angular relation between the beam and its supporting bracket and between the brake shoe and the wheel tread.

Other variations in the details of the structure may be made without departing from the spirit of the invention and the exclusive use of those modifications coming within the scope of the claims is contemplated.

I claim:
1. In combination with a railway brake beam having at each end of a tang part projecting from the end of the beam into a truck frame bracket having vertically spaced support and guide parts extending transversely of the tang part and between which the tang part slides during application and release of the brakes, a wear plate of hardened steel secured to the truck frame bracket parts and comprising a structure U-shaped in vertical cross section with an upright cross bar and with upper and lower legs slit lengthwise of the plate to form tongues which are displaced from said legs toward each other and yieldingly engage upper and lower faces of the beam tang part to maintain the angular relation between the parts in the movement of the beam lengthwise of the tongues to and from the wheels.

2. In combination with a railway brake beam having at each end a tang part projecting from the end of the beam into a truck frame bracket having vertically spaced support and guide parts extending transversely of the tang part and between which the tang part slides during application and release of the brakes, a wear plate of hardened steel secured to the truck frame bracket parts and comprising a structure U-shaped in vertical cross section with an upright cross bar and with upper and lower legs slit lengthwise of the plate inwardly from corresponding ends of the legs to form tongues which are displaced from said legs toward each other and bear against vertically opposite upper and lower portions of the beam tang part to maintain the angular relation between the parts in the movement of the beam lengthwise of the tongues to and from the wheels.

3. In combination with a railway brake beam having at each end a tang part projecting from the end of the beam into a truck frame bracket having vertically spaced support and guide parts extending transversely of the tang part and between which the tang part slides during application and release of the brakes, a wear plate of hardened steel secured to the truck frame bracket parts and comprising a structure U-shaped in vertical cross section with an upright cross bar and with upper and lower legs slit lengthwise of the plate inwardly from near opposite ends respectively of the legs to form tongues which are displaced from said legs toward each other and bear respectively against diagonally opposite upper and lower marginal corners of the beam tang part to maintain the angular relation between the parts in the movement of the beam lengthwise of the tongues to and from the wheels.

References Cited in the file of this patent

UNITED STATES PATENTS

| | | |
|---|---|---|
| 758,176 | Graham | Apr. 26, 1904 |
| 1,033,139 | Williams | July 23, 1912 |
| 1,995,113 | Brossart et al. | Mar. 19, 1935 |
| 2,254,513 | Busse | Sept. 2, 1941 |
| 2,394,232 | Cottrell | Feb. 5, 1946 |
| 2,436,738 | Barrows | Feb. 24, 1948 |
| 2,469,504 | Johnson et al. | May 10, 1949 |
| 2,499,549 | Walker | Mar. 7, 1950 |
| 2,661,818 | Tack | Dec. 8, 1953 |
| 2,808,906 | Busch | Oct. 8, 1957 |
| 2,911,073 | Holin | Nov. 3, 1959 |

FOREIGN PATENTS

| | | |
|---|---|---|
| 213,943 | Great Britain | Apr. 7, 1924 |